(12) United States Patent
Cheng et al.

(10) Patent No.: US 10,838,568 B2
(45) Date of Patent: Nov. 17, 2020

(54) DISPLAY SUBSTRATE, A DISPLAY APPARATUS, AND A METHOD FOR OPERATING THE DISPLAY APPARATUS

(71) Applicant: BOE TECHNOLOGY GROUP CO., LTD., Beijing (CN)

(72) Inventors: Chihjen Cheng, Beijing (CN); Yanling Han, Beijing (CN); Xiaoliang Ding, Beijing (CN); Xueyou Cao, Beijing (CN); Ping Zhang, Beijing (CN); Wei Liu, Beijing (CN); Pengpeng Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 380 days.

(21) Appl. No.: 15/761,379

(22) PCT Filed: Sep. 8, 2017

(86) PCT No.: PCT/CN2017/101021
§ 371 (c)(1),
(2) Date: Mar. 19, 2018

(87) PCT Pub. No.: WO2018/188259
PCT Pub. Date: Oct. 18, 2018

(65) Prior Publication Data
US 2020/0241671 A1    Jul. 30, 2020

(30) Foreign Application Priority Data

Apr. 13, 2017    (CN) .......................... 2017 1 0240210

(51) Int. Cl.
*G06F 3/046* (2006.01)
*G06F 3/041* (2006.01)
(Continued)

(52) U.S. Cl.
CPC ............ *G06F 3/046* (2013.01); *G06F 3/0416* (2013.01); *G06F 3/04883* (2013.01); *H01Q 1/44* (2013.01); *G06F 2203/04108* (2013.01)

(58) Field of Classification Search
CPC .......... G06F 3/017; G01S 13/88; G01S 13/89; G01S 13/02
See application file for complete search history.

(56) References Cited

U.S. PATENT DOCUMENTS 8,591,279 B1    11/2013  Cok et al.
9,178,572 B1 *  11/2015  Zhang ...................... H01Q 1/44
(Continued)

FOREIGN PATENT DOCUMENTS

CN          105408947 A        3/2016
CN          105470632 A        4/2016
(Continued)

OTHER PUBLICATIONS

International Search Report & Written Opinion dated Jan. 15, 2018, regarding PCT/CN2017/101021.
(Continued)

*Primary Examiner* — Yuzhen Shen
(74) *Attorney, Agent, or Firm* — Intellectual Valley Law, P.C.

(57) ABSTRACT

The present application discloses a display substrate having a display area including a plurality of subpixel regions and an inter-subpixel region. The display substrate includes an array of matrix of a plurality of subpixels. Each subpixel includes a subpixel region surrounded by multiple sections of the inter-sub-pixel region and at least one antenna is in the inter-subpixel region and configured to detect an electromagnetic wave signal.

17 Claims, 5 Drawing Sheets

(51) Int. Cl.
H01Q 1/44 (2006.01)
G06F 3/0488 (2013.01)

(56) References Cited

U.S. PATENT DOCUMENTS

| | | | |
|---|---|---|---|
| 2005/0012684 A1 | 1/2005 | Hewitt et al. | |
| 2014/0198073 A1 | 7/2014 | Gu et al. | |
| 2015/0022754 A1 | 1/2015 | Jepsen et al. | |
| 2016/0093940 A1 | 3/2016 | Pan et al. | |
| 2016/0351634 A1* | 12/2016 | Lim | G06F 1/1626 |
| 2017/0005651 A1* | 1/2017 | Ishimaru | H01L 23/5226 |
| 2017/0047361 A1 | 2/2017 | Xu et al. | |
| 2018/0373340 A1 | 12/2018 | Cheng et al. | |

FOREIGN PATENT DOCUMENTS

| | | |
|---|---|---|
| CN | 105529539 A | 4/2016 |
| CN | 105607745 A | 5/2016 |
| CN | 106098702 A | 11/2016 |
| CN | 205809836 U | 12/2016 |

OTHER PUBLICATIONS

First Office Action in the Chinese Patent Application No. 201710240210.1, dated Nov. 18, 2019; English translation attached.

* cited by examiner

DISPLAY SUBSTRATE, A DISPLAY APPARATUS, AND A METHOD FOR OPERATING THE DISPLAY APPARATUS

CROSS-REFERENCE TO RELATED APPLICATION

This application is a national stage application under 35 U.S.C. § 371 of International Application No. PCT/CN2017/101021, filed Sep. 8, 2017, which claims priority to Chinese Patent Application No. 201710240210.1, filed Apr. 13, 2017, the contents of which are incorporated by reference in the entirety.

TECHNICAL FIELD

The present invention relates to display technology, more particularly, to a display substrate, a display apparatus, and a method for operating the display apparatus.

BACKGROUND

As various display technologies are in progress, many applications of all kinds of display apparatus are developed. For example, a display apparatus that is functionally allowing an operator to remotely perform certain operations may be very useful for a car driver unable to use traditional operation method by direct finger-touching. Some display apparatus that can detect operation commands through specific hand gestures at a distance away from the display apparatus requires a radar device with a tiny size antenna that is able to be installed in the limited peripheral area in a boundary of a display substrate. Either the frame size of the display apparatus cannot be reduced further or the radar device much be worked at a very high frequency but with high-power consumption due to the small sized antenna.

Therefore, improved display substrate and related display apparatus are needed.

SUMMARY

In an aspect, the present disclosure provides a display substrate having a display area including a plurality of subpixel regions and an inter-subpixel region. The display substrate includes an array of a plurality of subpixels each of which includes a subpixel region surrounded by multiple sections of the inter-sub-pixel region. At least one antenna is in the inter-subpixel region and configured to detect an electromagnetic wave signal.

Optionally, the inter-subpixel region includes a light-blocking structure substantially covering entire projection of the inter-subpixel region on the display area.

Optionally, the display substrate includes a black matrix layer disposed in the inter-subpixel region. A projection of the black matrix layer on the display area substantially covers a projection of the at least one antenna on the display area.

Optionally, the at least one antenna is configured to be one of multiple patterns. Each pattern includes one or more antenna lines respectively in one or more sections of the inter-subpixel region connected by one or more connection lines in one or more alternate sections of the inter-subpixel region based on a user-selection of multiple operation modes.

Optionally, the display substrate includes multiple antennas. Each antenna is associated with the one of multiple patterns including at least one antenna line disposed within a portion of the inter-subpixel region separated from another antenna of the multiple antennas.

Optionally, the array of the plurality of subpixels is arranged into multiple rows and multiple columns. The at least one antenna line is physically extended in the inter-subpixel region along a first direction along a row of subpixels and/or physically extended along a second direction along a column of subpixels.

Optionally, each of the multiple antennas comprises multiple antenna lines, multiple connection lines, and multiple switch sets. The multiple antenna lines are parallel to each other and the multiple connection lines are perpendicular to the adjacent multiple antenna lines. Each pair of adjacent antenna lines is connected by at least one of the multiple connection lines including a switch set. The switch set includes a first switch device near a first one of the pair of antenna lines and a second switch device near the second one of the pair of antenna lines. The first switch device includes a first terminal coupled to the corresponding connection line, a second terminal coupled to the first one of the pair of antenna lines, and a first control terminal. The second switch device includes a first terminal coupled to the second one of the pair of antenna lines, a second terminal coupled to the corresponding connection line, and a second control terminal. The first switch device is turned on to connect its first terminal to its second terminal when the first control terminal receives a first turn-on signal. The second switch device is turned on to connect its first terminal to its second terminal when the second control signal receives a second turn-on signal.

Optionally, the multiple patterns of antennas respectively correspond to the multiple operation modes. Each pattern is formed by controlling the one or more switch sets selected to connect one or more corresponding connection lines for linking one or more corresponding pairs of the multiple antenna lines based on one of the multiple operation modes.

Optionally, the multiple patterns of antennas include at least a first pattern substantially with one or more antenna lines in strip shape extended along one or more edges of the display area and a second pattern substantially with one or more closed-loop shapes distributed partially across the display area. The first pattern and the second pattern are respectively used for a first operation mode using a gesture for remote operation from a side of the display substrate and a second operation mode using a gesture for remote operation in front of the display substrate.

Optionally, any one of the multiple antennas includes at least one transmission antenna configured to transmit electromagnetic waves to nearby space beyond the display substrate and at least one receiving antenna configured to detect a sensing signal formed by a modification of the electromagnetic waves induced by an object.

Optionally, the at least transmission antenna and the at least one receiving antenna are a same antenna which is used for transmitting electromagnetic waves and alternatively receiving sensing signals with a time-divisional protocol.

Optionally, the at least transmission antenna and the at least one receiving antenna are at least two different antennas having different patterns. The transmission antenna is used for transmitting electromagnetic waves and the receiving antenna is used to detect sensing signals independently.

Optionally, the object includes a hand in one or more static or changing gestures used to define one or more commands to remotely operate the display substrate from the nearby space beyond the display substrate.

Optionally, the display substrate further includes a color filter block in each subpixel region.

In another aspect, the present disclosure provides a display apparatus having the display substrate described herein. The display apparatus includes a driving chip, a transmission signal generator, and a sensing signal identifier. The transmission signal generator is coupled to the transmission antenna for transmitting electromagnetic waves. The sensing signal identifier is coupled to the receiving antenna to receive the sensing signal and configured to identify an operation command by decoding the sensing signal. The driving chip is coupled to the sensing signal identifier to receive the operation command and execute the operation command through interaction with at least part of an image displayed by the display substrate.

Optionally, the display apparatus includes a signal receiver, a mode selector, and a controller. The signal receiver is configured to receive an operator signal corresponding to a selection trigger command. The mode selector is coupled to the signal receiver and configured to execute the selection trigger command and generate a mode-selection signal corresponding to one of multiple operation modes of the display apparatus. The controller is coupled to the mode selector to receive the mode-selection signal and generate one or more control signals based on the mode-selection signal for selectively turning on one or more switch sets to form one of the multiple patterns of antennas with some of the multiple antenna lines connected by one or more connection lines within multiple sections of the inter-subpixel region. The one of the multiple patterns of antennas corresponds to the one of the multiple operation modes of the display apparatus.

Optionally, the display substrate is a color filter substrate of the display apparatus.

In yet another aspect, the present disclosure provides a method for operating the display apparatus described herein. The method includes receiving an operator signal for initiating one of multiple operation modes, generating a selection trigger command based on the operator signal, executing the selection trigger command to generate a mode-selection signal corresponding to one pattern of the multiple patterns of antennas, processing the mode-selection signal to generate one or more control signals, applying the one or more control signals to selectively turn on one or more switch sets in one or more connection lines to connect one or more pairs of antenna lines leading to a formation of the one pattern of the multiple patterns of antennas distributed fully within some sections of the inter-subpixel region. The one pattern of the multiple patterns of antennas is used for transmitting electromagnetic waves and receiving sensing signals according to the one of multiple operation modes.

Optionally, the operator signal is initiated by an operator with a remote gesture for operating the display apparatus.

Optionally, the multiple patterns of antennas include at least a first pattern having one or more pairs of antenna lines in strip shape extended along one or more edges of the display area and a second pattern having one or more closed-loop shapes distributed partially across the display area. The first pattern and the second pattern are respectively used for a first operation mode with a remote gesture at a side of the display apparatus and a second operation mode with a remote gesture in front of the display apparatus.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Figure 1:
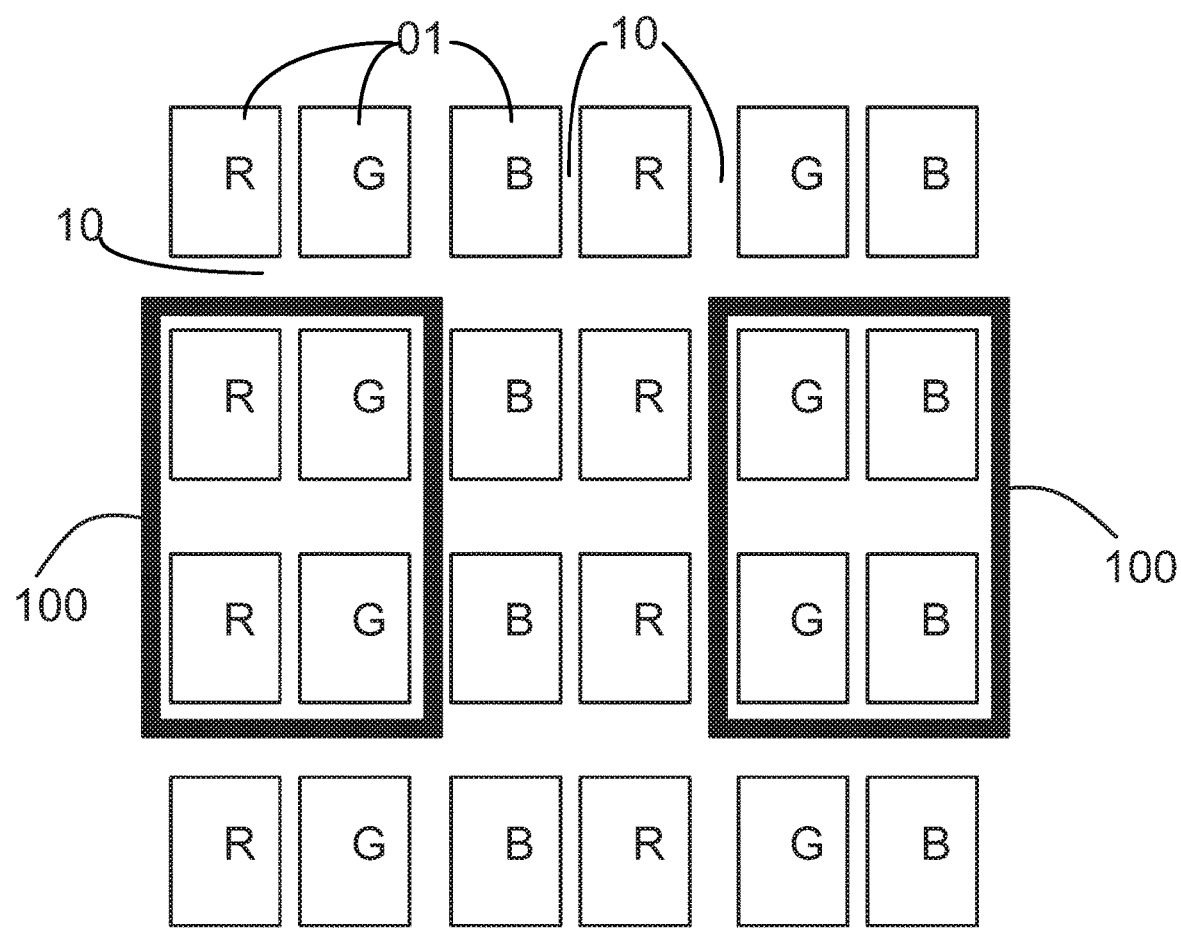
FIG. 1 is a schematic diagram of a display substrate according to an embodiment of the present disclosure.

In an aspect, the present disclosure provides a display substrate including a display area framed by a peripheral area. The display area includes multiple subpixel regions and an inter-subpixel region. As shown in FIG. 1, the display area includes an array of a plurality of subpixels 01 arranged in rows and columns. Each subpixel 01 is surrounded by four sections of inter-subpixel region 10. All sections of inter-subpixel region are connected to each other. Referring to FIG. 1, the display substrate also includes at least one antenna 100, optionally made by metal lines, disposed in the inter-subpixel region 10. A projection of the inter-subpixel region 10 on a base substrate of the display substrate substantially covers a projection of the at least one antenna on the base substrate. Optionally, the projection of some sections of the inter-subpixel region 10 on the base substrate substantially in the projection of the at least one antenna 100 on the base substrate. The at least one antenna includes at least a transmitting antenna used for transmitting electromagnetic waves to at least nearby space beyond the display substrate. The at least one antenna includes at least a receiving antenna used to receive sensing signals formed with modified electromagnetic waves induced by objects at nearby space beyond the display substrate.

As used herein, the term "display area" refers to an area of a display substrate (e.g., an opposing substrate or an array substrate) in a display panel where image is actually displayed. Optionally, the display area may include multiple subpixel regions and an inter-subpixel region. A subpixel region refers to a light emission region of a subpixel, such as a region corresponding to a pixel electrode in a liquid crystal display or a region corresponding to a light emissive layer in an organic light emitting diode display panel. An inter-subpixel region refers to a boundary section between adjacent subpixel regions, such as a region corresponding to a black matrix in a liquid crystal display or a region corresponding to a pixel definition layer in an organic light emitting diode display panel. Optionally, the inter-subpixel region is a boundary section between adjacent subpixel regions in a same pixel. Optionally, the inter-subpixel region is a boundary section between two adjacent subpixel regions from two adjacent pixels.

As used herein the term "peripheral area" refers to an area of a display substrate (e.g., an opposing substrate or an array substrate) in a display panel where various circuits and wires are provided to transmit signals to the display substrate. To increase the transparency of the display apparatus, non-transparent or opaque components of the display apparatus (e.g., battery, printed circuit board, metal frame), can be disposed in the peripheral area rather than in the display areas.

As used herein, a subpixel region refers to a light emission region of a subpixel, such as a region corresponding to a pixel electrode in a liquid crystal display or a region corresponding to a light emissive layer in an organic light emitting diode display panel. Optionally, a pixel may include a number of separate light emission regions corresponding to a number of subpixels in the pixel. Optionally, the subpixel region is a light emission region of a red color subpixel. Optionally, the subpixel region is a light emission region of a green color subpixel. Optionally, the subpixel region is a light emission region of a blue color subpixel. Optionally, the subpixel region is a light emission region of a white color subpixel.

As used herein, an inter-subpixel region refers to a boundary section between adjacent subpixel regions, such as a region corresponding to a black matrix in a liquid crystal display or a region corresponding a pixel definition layer in an organic light emitting diode display panel. Optionally, the inter-subpixel region is a boundary section between adjacent subpixel regions in a same pixel. Optionally, the inter-subpixel region is a boundary section between two adjacent subpixel regions from two adjacent pixels. Optionally, the inter-subpixel region is a boundary section between a subpixel region of a red color subpixel and a subpixel region of an adjacent green color subpixel. Optionally, the inter-subpixel region is a boundary section between a subpixel region of a red color subpixel and a subpixel region of an adjacent blue color subpixel. Optionally, the inter-subpixel region is a boundary section between a subpixel region of a green color subpixel and a subpixel region of an adjacent blue color subpixel.

Accordingly, the present disclosure provides, inter alia, a display substrate, a display apparatus having the same, and a method thereof that substantially obviate one or more of the problems due to limitations and disadvantages of the related art. In one aspect, the at least one antenna is just one antenna formed within the inter-subpixel region in the display area. Alternatively, the at least one antenna includes multiple antennas. Each antenna is separately distributed at different portions within the inter-subpixel region.

In the embodiment of just one antenna is included in the display substrate. The antenna can be used as a transmitting antenna for transmitting electromagnetic waves based on certain requirement of an operation mode of the display substrate. The same antenna also can be used as a receiving antenna for receiving sensing signal formed from reflections of modified electromagnetic waves. The display substrate is configured to operate the just one antenna using a time-division protocol. In other words, in a detection period, the antenna transmits electromagnetic waves (usually in radio frequency) for detecting remote object as well as its variation at nearby space beyond the display substrate. In a sensing period, the antenna will stop transmitting electromagnetic waves but is configured to receive sensing signals induced by reflections of the (early-transmitted) electromagnetic waves modified by the object in static or in motion or any specific variations.

Alternatively, in the embodiment with multiple antennas, a first part of the multiple antennas is used for transmitting electromagnetic waves for detecting objects in nearby space based on a certain operation mode of the display substrate. A second part of the multiple antennas is used to receive sensing signals induced by the objects at nearby space onto the electromagnetic waves transmitted by the first part of the multiple antennas. Of course, in this embodiment, it is still optional to use entire multiple antennas for both transmitting electromagnetic waves and receiving sensing signals under the time-divisional protocol.

Optionally, the display substrate disclosed above can be implemented in a display apparatus that is capable of being operated to identify hand gestures of its operators. As the antennas associated with the display substrate are disposed fully within the inter-subpixel region and not in the light-emitting subpixel regions of the display area, the image display of the display apparatus will not be affected at all by the antennas. At the same time, the antennas also not take any space of peripheral area in the frame area of the display substrate so that the frame width of the display apparatus needs not to be widened. Optionally, the display substrate can be configured to have relative large display area, relative small frame width, in addition to a function capable of being operated by hand gestures from a distance. Furthermore, in this display substrate, large number of antennas can be disposed to take larger portion of the display area (by substantially utilizing more sections of the inter-subpixel region) so that more probing electromagnetic waves can be transmitted to nearby space beyond the display substrate to enhance sensing accuracy for identifying each hand gesture as a corresponding operation command.

Figure 2:
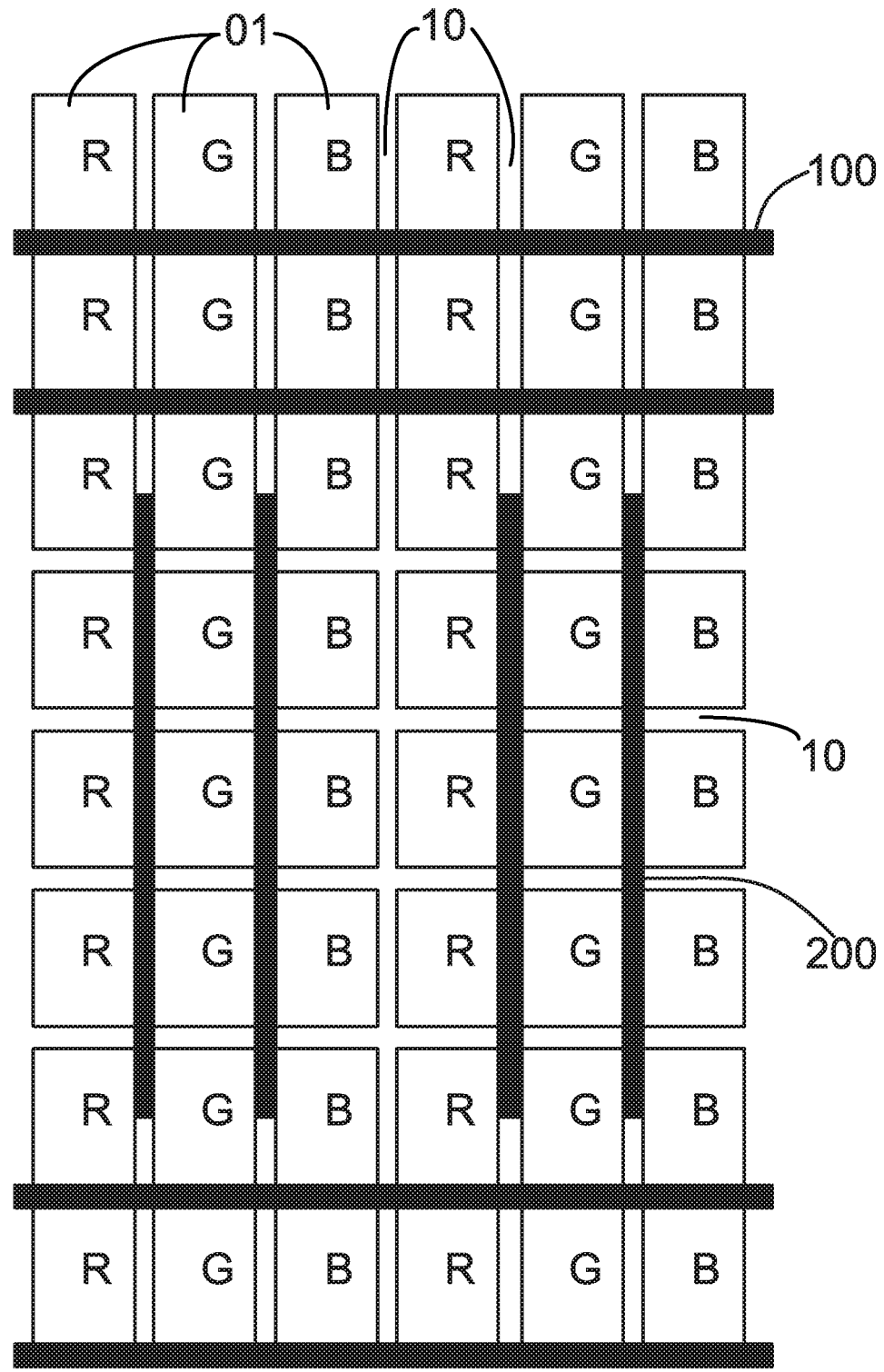
FIG. 2 is a schematic diagram of a display substrate according to another embodiment of the present disclosure.
Figure 3:
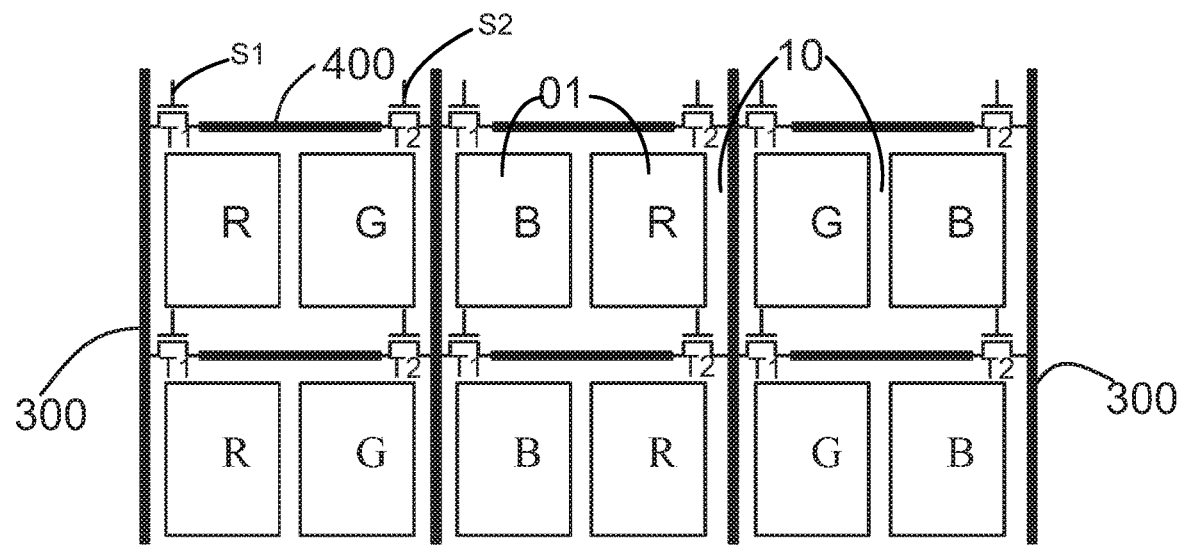
FIG. 3 is a schematic diagram of a display substrate according to yet another embodiment of the present disclosure.

FIG. 1 through FIG. 3 show three embodiments of the multiple antennas (100, 200, 300) in various patterns disposed within the inter-subpixel region of the display area of the display substrate. As shown, each pixel in the display area includes three kinds of subpixels 00: red subpixel R, green subpixel G, and blue subpixel B. Optionally, the pixel can also include white subpixel or yellow subpixel.

Optionally, each antenna is made by metal material. Optionally, the antenna includes multiple antenna line made by metal line which is typically not transparent. When the antenna line is formed by a non-transparent metal line disposed within the inter-subpixel region, the non-transparent metal line also acts as a light-blocking structure that effectively enhance displayed image.

Optionally, for enhancing display effect of the display apparatus having the display substrate of the present disclosure, the display substrate also includes a black matrix layer disposed with its projection on the display area substantially cover the projection of the inter-subpixel region on the display area. The antennas of the present disclosure are disposed on the black matrix layer accordingly.

Optionally, the antennas of the present disclosure can be formed in any shape or structure. At least in one example, an antenna 100 is formed as a closed loop shape, as shown in FIG. 1.

Optionally, the antenna 100 or 200 can be formed in strip shape, as shown in FIG. 2. In the display area, multiple subpixels 01 are arranged into multiple rows and multiple columns. The multiple antennas 100 can be configured to be multiple antenna lines extended along a direction defined by the row of subpixels fully in the inter-subpixel region 10. Optionally, the multiple antennas 200 can be configured to be multiple antenna lines extended along a direction defined by the column of subpixels fully in the inter-subpixel region 10. Optionally, the multiple antennas are configured by both types of antenna lines arranged in a direction of row and antenna lines arranged in another direction of column. FIG. 2 shows an example of four antenna lines 100 extended along the direction of row of subpixels and four other antenna lines 200 extended along the direction of column of subpixels, all being disposed fully in the inter-subpixel region 10.

Optionally, the antennas in closed loop shapes are able to transmit a stronger electromagnetic wave towards a direction above the surface of the display substrate and reach a farther displace. Optionally, the antennas in strip shapes, e.g., the antenna lines, they are good at collecting and transporting signals along the same direction that the antenna lines are extended.

For example, Referring to FIG. 2, the display substrate includes multiple antenna lines 100 extended along the direction of rows of subpixels and also includes multiple antenna lines 200 extended along the direction of columns of subpixels. The antenna 100 can be used to transmit electromagnetic wave selectively along the direction of rows of subpixels and collecting sensing signals in the same direction. The antenna 200 can be used to transmit electromagnetic wave selectively along the direction of columns of subpixels and collecting sensing signals in the same direction. Thus, the signal transporting efficiency can be substantially enhanced.

Optionally, different antennas with different pattern can be correlated with different operation modes of the display substrate by utilizing their different transmission/reception characteristics. In other words, a display apparatus with such a display substrate can be specifically configured with different patterns of antennas to adapt specific user requirements for special applications.

Optionally, for transmitting stronger electromagnetic waves to nearby space beyond the display substrate and more accurately capturing the reflected electromagnetic waves from hand (of the operator), the display substrate is configured to dispose multiple antennas 100.

FIG. 3 shows a schematic diagram of a display substrate according to a third embodiment of the present disclosure. Referring to FIG. 3, the display substrate includes a group of antennas formed in multiple sections of inter-subpixel region 10 respectively around multiple subpixel regions 00. Each antenna includes multiple antenna lines 300, multiple connection lines 400, and multiple switch sets (T1, T2) respectively associated with the multiple connection lines. In each group of antennas, multiple antenna lines 300 are in parallel and multiple connection lines 400 are disposed in a perpendicular direction between a pair of antenna lines. Each connection line has a switch set. Each switch set (T1, T2) includes a first switch device T1 near a first one of the pair of antenna lines and a second switch device T2 near a second one of the pair of antenna lines. Specifically, the first switch device includes a first terminal coupled electrically to one terminal of the corresponding connection line and a second terminal coupled electrically to the first one of the pair of antenna lines. The second switch device includes a first terminal coupled electrically to the second one of the pair of antenna lines and a second terminal coupled electrically to another terminal of the corresponding connection line.

Optionally, the first switch device T1 and the second switch device T2 are made of thin-film transistors. The first switch device T1 is configured to make its first terminal to be conducted to its second terminal when a control terminal S1 of the first switch device T1 receives a first control signal, i.e., the first switch device T1 is turned on. The second switch device T2 is configured to make its first terminal to be conducted to its second terminal when a control terminal S2 of the second switch device T2 receives a second control signal, i.e., the second switch device T2 is turned on.

When both the first switch device T1 and the second switch device T2 are turned on, the corresponding connection line 400 is a conduction line connected the pair of antenna lines 300 at two ends of the connection line. When multiple connection lines between the pair of antenna lines become conduction lines, the pair of antenna lines and the connection lines form one or more closed loop shapes. Optionally, when both the first switch device and the second switch device are turned off, each antenna line is in strip shape.

Therefore, by providing the first control signal and the second control signal to different switch sets at different location, the pattern of antennas in the display substrate can be changed. As used herein, the pattern of antennas is a pattern of conductor lines formed by both the antenna lines as well as their connection lines within the inter-subpixel region that is eventually used for transmitting electromagnetic waves to nearby space beyond the display substrate. Each display substrate can be configured to form various pattern of antennas in different shapes. The pattern of antennas includes at least an antenna line 300. When all connection lines 400 are disconnected from the antenna line 300, the pattern of antennas is a strip shape. When the first switch device T1 and the second switch device T2 in certain switch sets are turned on, the corresponding connection line 400 can connect corresponding pair of antenna lines 300 and a loop pattern may be formed. The pattern of antennas includes both the antenna lines and the corresponding connection lines.

Optionally, the display substrate can be configured to include one or more or any sets of antenna lines. Each set of antenna lines can be extended in any direction and can be the same or different from the extended direction of other set of antenna lines.

FIG. 3 is a schematic diagram of a set of antenna lines disposed in inter-subpixel region of a display substrate according to an embodiment of the present disclosure. Referring to FIG. 3, one set of antenna lines is shown. The antenna lines 300 are extended along a direction of column of subpixels 01 within some sections of inter-subpixel region 10. Connection lines 400 are extended perpendicular to the antenna lines, i.e., along a direction of rows of subpixels 01 and within some other sections of the inter-subpixel region 10. Each switch set includes a first switch device T1 and a second switch device T2, both are provided as thin-film transistors. The gate of the first switch device T1 is its control terminal S1. The gate S2 of the second switch device T2 is its control terminal S2.

If the first switch device T1 and the second switch device T2 are controlled via their corresponding control terminals to be turned off, a strip shape can be obtained for the pattern of antenna. If the control terminal of the first switch device receives a first control signal to turn on the first switch device T1 and the control terminal of the second switch device receives a second control signal to turn on the second switch device T2, the corresponding connection line 400 is a conduction line between the two corresponding antenna lines 300, forming a pattern of antenna in a closed loop shape.

Optionally, the display substrate of the present disclosure can be an array substrate or a color filter substrate. Optionally, each subpixel of the display substrate includes a color filter block. The display substrate can includes multiple-colored color filter blocks respectively for different colored subpixels. Compared with array substrate, the color filter substrate contains less number of circuits. As the antenna lines are disposed in the inter-subpixel region of the color filter substrate, the possibility of signal interference between the antenna and different kinds of circuits in the substrate is relatively small. This helps to enhance the sensing accuracy of the antenna used for identifying different hand gestures.

Referring to FIG. 1 through FIG. 3, the display substrate includes different colored subpixels 01 such as red subpixels R, green subpixels G, and blue subpixels B. For LCD display, a red color filter block is disposed in each of red subpixels R, a green color filter block is disposed in each of green subpixels G, and a blue color filter block is disposed in each of the blue subpixels B. For OLED display, a red color LED may be disposed in each of the red subpixels R, a green color LED may be disposed in each of the green subpixels G, and a blue color LED may be disposed in each of the blue subpixels B.

Optionally, the antenna includes a transmitting antenna and a receiving antenna. The transmitting antenna is used for transmitting electromagnetic waves and the receiving antenna is used for collecting sensing electromagnetic waves. For example in FIG. 3, one antenna in closed loop shape is used as a transmitting antenna. Another antenna in closed loop shape is used as a receiving antenna. Optionally, all antennas can be employed to transmit electromagnetic waves as radar probe signals to nearby space beyond the display substrate, and all antennas also can be set up to collect reflected electromagnetic waves which are used to generate sensing signals.

Figure 4:
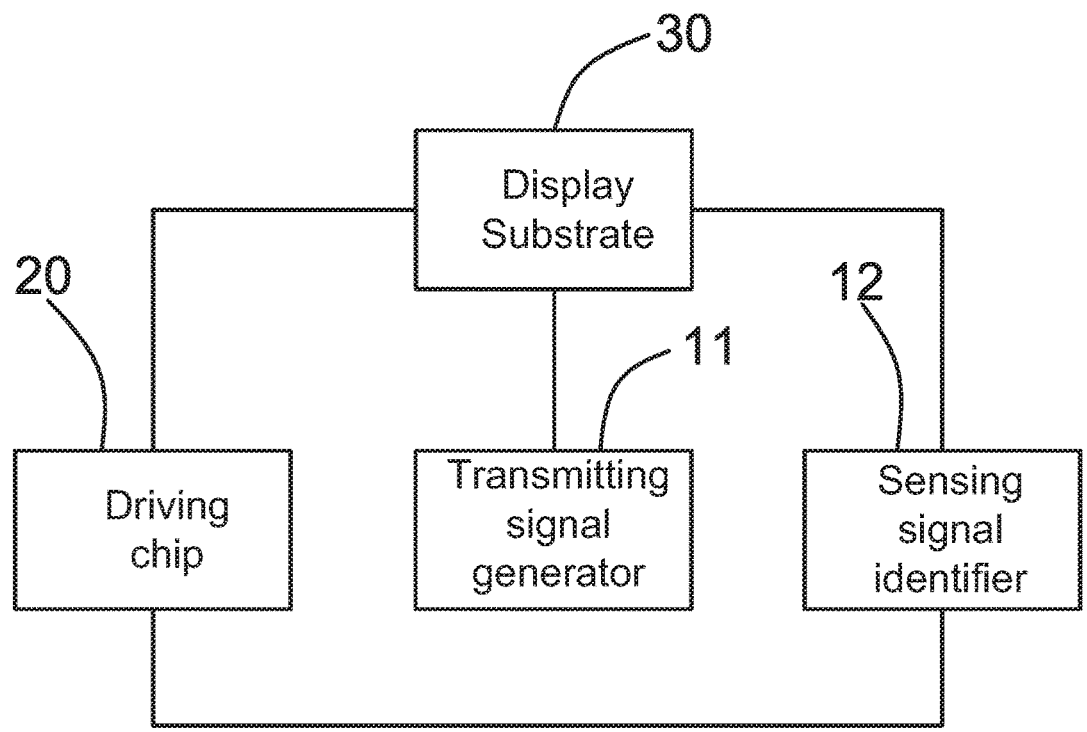
FIG. 4 is a simplified block diagram of a display apparatus according to some embodiments of the present disclosure.

In another aspect, the present disclosure provides a display apparatus having the display substrate described herein, FIG. 4 is a simplified block diagram of a display apparatus including the display substrate 30, a sensing signal identifier 12, a transmitting signal generator 11, and a driving chip 20. The display substrate 30 is the display substrate described herein. Although specific connections are not limited here, the transmitting signal generator 11 is coupled to the antenna (or at least a transmitting antenna) in the display substrate 30. The sensing signal identifier 12 is coupled to the antenna (or at least a receiving antenna) in the display substrate 30. The driving chip 20 is coupled to the sensing signal identifier 12 and the display substrate 30.

Optionally, the transmitting signal generator 11 is configured to generate a driving signal for initiating electromagnetic waves being transmitted by the (transmitting) antenna disposed in the display substrate 30. Optionally, the driving signal may be determined by an initiation of a certain operation mode by an operator of the display apparatus. For example, the operator decides to start an operation mode enabling remote operation using hand gestures as remote control commands.

Optionally, the sensing signal identifier 12 is configured to couple with the antenna (or at least the receiving antenna) in the display substrate 30 to collect reflected electromagnetic waves modified by objects in nearby space beyond the display substrate and configured to convert the collected electromagnetic waves to a sensing signal. The sensing signal can be further decoded to a certain operation command.

Optionally, the driving chip 20 is coupled to the sensing signal identifier 12 to receive the operation command and is configured to execute the operation command to achieve corresponding remote control/operation through interaction with the displayed image in the display substrate 30.

Since the antennas are disposed in the display area within the inter-subpixel region, there are more space to allow more antenna lines to be included in the display substrate. More antenna lines are able to transmit more or stronger electromagnetic waves to nearby space beyond the display substrate, which allows more accurate identification of hand gestures of the operator. Since the antenna lines are disposed fully within the inter-subpixel region, they pose no interference to the normal image display of the display apparatus and do not cause any size increase to the peripheral area that surrounds the display area of the display apparatus.

Optionally, the sensing signal identifier 12 is configured to identify one or more operation commands encoded in the sensing signal generated from the collected electromagnetic waves that are modified by an operator via his/her hand gestures at a remote distance. Each sensing signal corresponds to a certain hand gesture. Each hand gesture can be used to pre-define a certain operation command so that it is identifiable by the sensing signal identifier 12.

Optionally, the transmitting signal generator 11 is coupled to multiple antennas. The same multiple antennas are also coupled to the sensing signal identifier 12. Therefore, a time-division protocol is applied to drive the operation of the multiple antennas for detecting the operation commands corresponding to certain hand gestures of the operator. The time-division protocol allows the multiple antennas to transmit electromagnetic waves based on driving signal sent from the transmitting signal generator 11 during a probe period and allows the sensing signal identifier 12 to receive sensing signals generated from the reflected electromagnetic waves collected by the same multiple antennas during a detection period.

Figure 5:
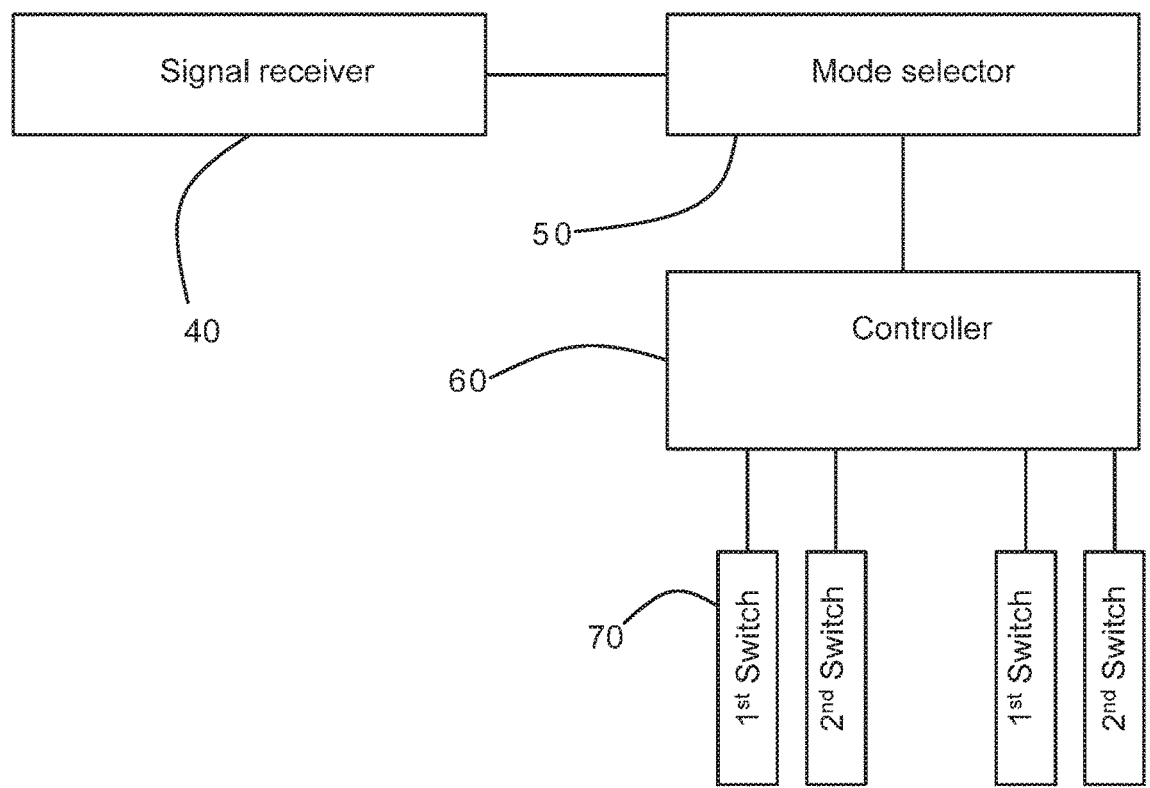
FIG. 5 is a control block diagram showing a link of several functional devices for operating the display apparatus according to some embodiments of the present disclosure.

In an alternative embodiment, the display apparatus includes multiple sets of antennas and having multiple switch sets disposed for multiple connection lines, configured to optionally select a preferred one of multiple possible patterns of multiple antennas in the display substrate. FIG. 5 is a simplified block diagram showing a link of several functional devices for operating the display apparatus according to some embodiments of the present disclosure. Referring to FIG. 5, the display apparatus includes a signal receiver 40, a mode selector 50, and a controller 60 associated with the display substrate having the multiple sets of antenna lines and the multiple switch sets. Using these functional devices, i.e., the signal receiver 40, the mode selector 50, and the controller 60, an operator can initiate an operator signal based on what he or she intended to set the display apparatus in one of multiple operation modes to configure a specific pattern of antenna in the display substrate. The display substrate has been configured with multiple antenna lines, multiple connection lines, and multiple switch sets all disposed within the inter-subpixel region according to FIG. 3.

In particular, the signal receiver 40 is configured to receive the operator signal initiated by an operator of the display apparatus. The operator signal can have many types, each type corresponds to one of different selection trigger commands. Optionally, the signal receiver 40 is configured to generate a corresponding selection trigger command based on the received operator signal and send the selection trigger command to the mode selector 50.

Each selection trigger command corresponds to a mode-selection signal. Every mode-selection signal corresponds to a respective pattern of multiple patterns of antennas. Optionally, an one-to-one correspondence relationship is provided between multiple mode-selection signals and multiple patterns of antennas. The mode selector 50 is configured to generate a mode-selection signal based on the received selection trigger command and send the mode-selection signal to the controller 60.

The mode-selection signal contains at least information about types of control signals for the gates of the first switch device and the second switch device of each corresponding switch set. For example, the types of control signals include a turn-on voltage signal that is capable of turning on the corresponding switch device or a turn-off voltage signal that is designed to turn off the corresponding switch device.

The controller 60 is configured to send the turn-on voltage signal or the turn-off voltage signal to the gates of the first switch device and the second switch device of the corresponding switch sets based on the mode-selection signal, accordingly, enabling one or more connection lines to connect one or more pairs of antennas for forming corresponding pattern of antenna. Each of the control signals corresponding to respective gates of the first switch devices and the second switch devices is generated by the controller 60. Optionally, the display substrate includes a first signal line connected between the controller 60 and the gate of each first switch device and a second signal line connected between the controller 60 and the gate of each second switch device.

As described herein, the operator signal is initiated by an operator of the display apparatus. Optionally, a gear switch may be installed on the display apparatus, allowing the operator to set the gear switch to one of different positions to initiate one of different selection trigger commands. Optionally, the operator can input the selection trigger command through keyboard, touch screen, or other user interfaces.

Optionally, the operator can select a particular pattern of antenna based on specific application of the display apparatus. For example, when the hand of the operator is primarily located at a side of the display apparatus, or the operator intends to operate the display apparatus in an operation mode that enables remote hand control primarily near the side of the display apparatus, the pattern of antenna may be preset to that contains all separate antenna lines in strip shape perpendicular to the side of the display apparatus. In another example, when the hand of the operator is located in front of the display apparatus, the pattern of antenna may be preset to that contains one or more closed loop shapes.

Figure 6:
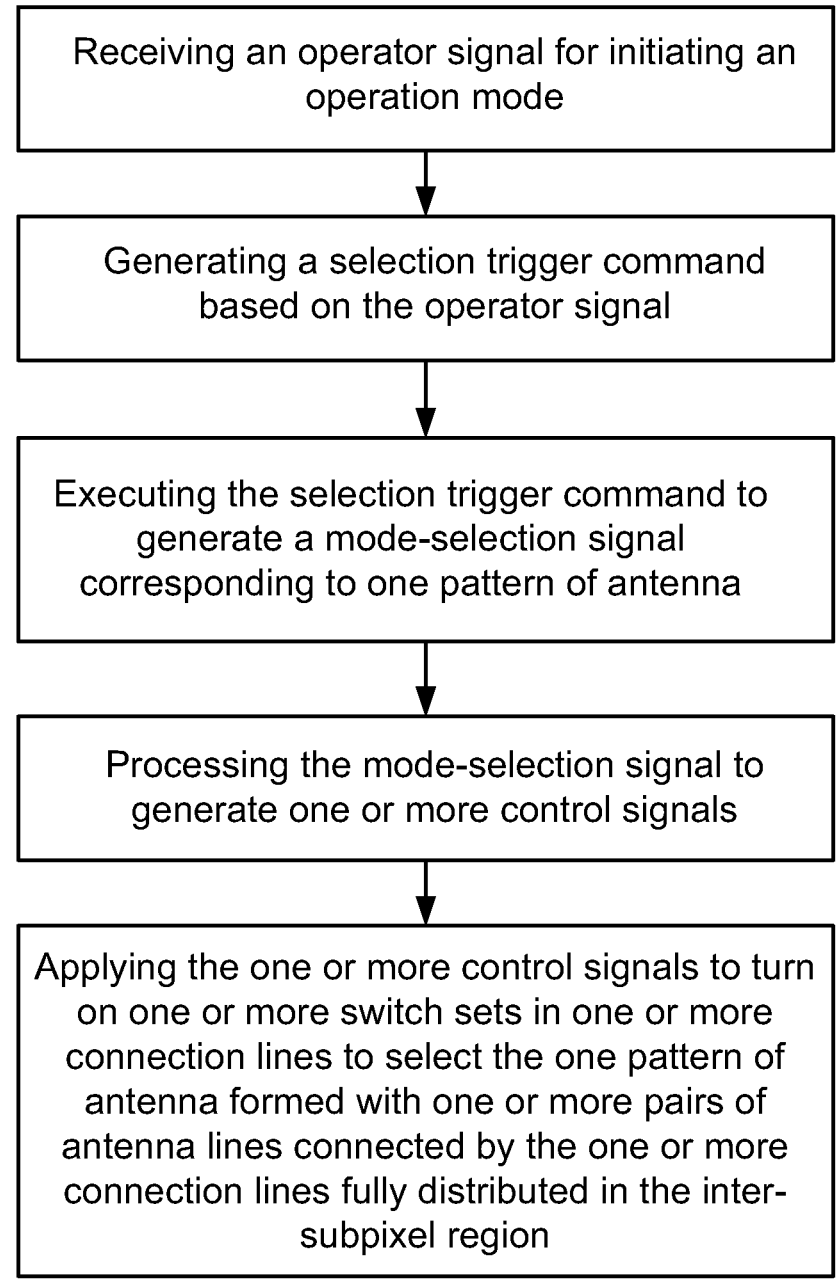
FIG. 6 is a method for operation the display apparatus having the link of the several functional devices according to an embodiment of the present disclosure.

In yet another aspect, the present disclosure provides a method for operating a display apparatus. The display apparatus is the one described herein throughout the specification. FIG. 6 is a method for operation the display apparatus having the link of the several functional devices of FIG. 5 according to an embodiment of the present disclosure. As shown, the method includes receiving an operator signal for initiating one of multiple operation modes. Referring to FIG. 5, the signal receiver is used to receive the operator signal, i.e., a signal provided by an operator of the display apparatus. Then, the method includes generating a selection trigger command based on the operator signal. Each operator signal is corresponding to a specific selection trigger command. The signal receiver is configured to generate the selection trigger command based on the received operator signal.

Additionally, the method includes executing the selection trigger command to generate a mode-selection signal. Referring to FIG. 5, the mode selector is used to execute the selection trigger command and to generate the mode-selection signal. The mode-selection is preset to be associated with a pattern of antennas.

Further, the method includes processing the mode-selection signal to generate one or more control signals. Referring again to FIG. 5, the controller is configured to receive the mode-selection signal from the mode selector and to process the mode-selection signal to generate one or more control signals.

Furthermore, the method includes applying the one or more control signals to turn on one or more switch sets associated with one or more connection lines between one or more pairs of antenna lines. The one or more control signals, optionally, are generated as turn-on voltage signals that are designed to turn on corresponding thin-film transistors if they are applied to the corresponding gates as control terminals of the switch devices. Since the one or more control signals are generated based on the mode-selection signal, they are selected to form a particular pattern of antennas by connecting one or more particular pairs of antenna lines via one or more particular connection lines. The formed pattern of antenna is preset to be used for transmitting electromagnetic waves and receiving sensing signals in the operation mode corresponding to the operator signal initially received by the display apparatus.

In the method described herein, the operator signal is initiated by an operator with a remote gesture for operating the display apparatus. Each operator signal corresponds to one operation mode that can be selected among multiple modes. The operator can chose one based on specific application of the display apparatus and his/her relative position around the display apparatus. Each operation mode can be preset to be associated with one particular pattern of of multiple patterns of antennas that facilitates the particular operation mode. Optionally, the multiple patterns of antenna includes at least a first pattern having one or more pairs of antenna lines extended along one or more edges of the display area and a second pattern having one or more closed-loops distributed partially across the display area. The first pattern and the second pattern are respectively used for a first operation mode with a remote gesture at a side of the display apparatus and a second operation mode with a remote gesture in front of the display apparatus.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display substrate having a display area including a plurality of subpixel regions and an inter-subpixel region, comprising:
   an array of a plurality of subpixels, each subpixel including a subpixel region surrounded by multiple sections of the inter-subpixel region; and
   at least one antenna in the inter-subpixel region and configured to detect an electromagnetic wave signal;
   wherein the at least one antenna is configured to be one of multiple patterns, each pattern comprising one or more antenna lines respectively in one or more sections of the inter-subpixel region connected by one or more connection lines in one or more alternate sections of the inter-subpixel region based on a user-selection of multiple operation modes;
   wherein each of the multiple antennas comprises multiple antenna lines, multiple connection lines, and multiple switch sets, the multiple antenna lines being parallel to each other and the multiple connection lines being perpendicular to the adjacent multiple antenna lines, each pair of adjacent antenna lines being connected by at least one of the multiple connection lines including a switch set;
   wherein the switch set includes:
   a first switch device near a first one of the pair of antenna lines and
   a second switch device near the second one of the pair of antenna lines,
   wherein the first switch device includes:
   a first terminal coupled to the corresponding connection line, a second terminal coupled to the first one of the pair of antenna lines, and
   a first control terminal,
   wherein the second switch device includes:
   a first terminal coupled to the second one of the pair of antenna lines,
   a second terminal coupled to the corresponding connection line, and
   a second control terminal,
   the first switch device being turned on to connect its first terminal to its second terminal when the first control terminal receives a first turn-on signal,
   the second switch device being turned on to connect its first terminal to its second terminal when the second control signal receives a second turn-on signal;
   wherein the multiple patterns of antennas respectively correspond to the multiple operation modes, each pattern being formed by controlling the one or more switch sets selected to connect one or more corresponding connection lines for linking one or more corresponding pairs of the multiple antenna lines based on one of the multiple operation modes.

2. The display substrate of claim 1, wherein the inter-subpixel region comprises a light-blocking structure substantially covering entire projection of the inter-subpixel region on the display area.

3. The display substrate of claim 1, wherein the display substrate includes a black matrix layer disposed in the inter-subpixel region, a projection of the black matrix layer on the display area substantially covers a projection of the at least one antenna on the display area.

4. The display substrate of claim 1, wherein the display substrate comprises multiple antennas, each antenna being associated with the one of multiple patterns including at least one antenna line disposed within a portion of the inter-subpixel region separated from another antenna of the multiple antennas.

5. The display substrate of claim 1, wherein the array of the plurality of subpixels is arranged into multiple rows and multiple columns,
   wherein the at least one antenna line is physically extended in the inter-subpixel region along a first direction along a row of subpixels and/or along a second direction along a column of subpixels.

6. The display substrate of claim 1, wherein the multiple patterns of antennas comprise at least a first pattern substantially with one or more antenna lines in strip shape extended along one or more edges of the display area and a second pattern substantially with one or more closed-loop shapes distributed partially across the display area, the first pattern and the second pattern being respectively used for a first operation mode using a gesture for remote operation from a side of the display substrate and a second operation mode using a gesture for remote operation in front of the display substrate.

7. The display substrate of claim 6, wherein any one of the multiple antennas comprises at least one transmission antenna configured to transmit electromagnetic waves to nearby space beyond the display substrate and at least one receiving antenna configured to detect a sensing signal formed by a modification of the electromagnetic waves induced by an object.

8. The display substrate of claim 7, wherein the at least transmission antenna and the at least one receiving antenna are a same antenna, wherein the same antenna is used for transmitting electromagnetic waves and alternatively receiving sensing signals with a time-divisional protocol.

9. The display substrate of claim 7, wherein the at least transmission antenna and the at least one receiving antenna are at least two different antennas having different patterns, wherein the transmission antenna is used for transmitting electromagnetic waves and the receiving antenna is used to detect sensing signals independently.

10. The display substrate of claim 7, wherein the object includes a hand in one or more static or changing gestures used to define one or more commands to remotely operate the display substrate from the nearby space beyond the display substrate.

11. The display substrate of claim 1, further comprising a color filter block in each subpixel region.

12. A display apparatus, comprising a display substrate, a driving chip, a transmission signal generator, and a sensing signal identifier
   wherein the display substrate comprises a display area including a plurality of subpixel regions and an inter-subpixel region;
   wherein the display substrate comprises an array of a plurality of subpixels, each subpixel including a subpixel region surrounded by multiple sections of the inter-subpixel region; and
   at least one antenna in the inter-subpixel region and configured to detect an electromagnetic wave signal;

wherein the at least one antenna is configured to be one of multiple patterns, each pattern comprising one or more antenna lines respectively in one or more sections of the inter-subpixel region connected by one or more connection lines in one or more alternate sections of the inter-subpixel region based on a user-selection of multiple operation modes;

wherein each of the multiple antennas comprises multiple antenna lines, multiple connection lines, and multiple switch sets, the multiple antenna lines being parallel to each other and the multiple connection lines being perpendicular to the adjacent multiple antenna lines, each pair of adjacent antenna lines being connected by at least one of the multiple connection lines including a switch set;

wherein the switch set includes:

a first switch device near a first one of the pair of antenna lines and a second switch device near the second one of the pair of antenna lines, wherein the first switch device includes:

a first terminal coupled to the corresponding connection line, a second terminal coupled to the first one of the pair of antenna lines, and a first control terminal, wherein the second switch device includes:

a first terminal coupled to the second one of the pair of antenna lines, a second terminal coupled to the corresponding connection line, and a second control terminal, the first switch device being turned on to connect its first terminal to its second terminal when the first control terminal receives a first turn-on signal, the second switch device being turned on to connect its first terminal to its second terminal when the second control signal receives a second turn-on signal;

wherein the multiple patterns of antennas respectively correspond to the multiple operation modes, each pattern being formed by controlling the one or more switch sets selected to connect one or more corresponding connection lines for linking one or more corresponding pairs of the multiple antenna lines based on one of the multiple operation modes;

wherein the multiple patterns of antennas comprise at least a first pattern substantially with one or more antenna lines in strip shape extended along one or more edges of the display area and a second pattern substantially with one or more closed-loop shapes distributed partially across the display area, the first pattern and the second pattern being respectively used for a first operation mode using a gesture for remote operation from a side of the display substrate and a second operation mode using a gesture for remote operation in front of the display substrate;

wherein any one of the multiple antennas comprises at least one transmission antenna configured to transmit electromagnetic waves to nearby space beyond the display substrate and at least one receiving antenna configured to detect a sensing signal formed by a modification of the electromagnetic waves induced by an object;

wherein the transmission signal generator is coupled to the transmission antenna for transmitting electromagnetic waves, the sensing signal identifier is coupled to the receiving antenna to receive the sensing signal and configured to identify an operation command by decoding the sensing signal, the driving chip is coupled to the sensing signal identifier to receive the operation command and execute the operation command through interaction with at least part of an image displayed by the display substrate.

13. The display apparatus of claim 12, comprising a signal receiver, a mode selector, and a controller, the signal receiver being configured to receive an operator signal corresponding to a selection trigger command, the mode selector being coupled to the signal receiver and configured to execute the selection trigger command and generate a mode-selection signal corresponding to one of multiple operation modes of the display apparatus, the controller being coupled to the mode selector to receive the mode-selection signal and generate one or more control signals based on the mode-selection signal for selectively turning on one or more switch sets to form one of the multiple patterns of antennas with some of the multiple antenna lines connected by one or more connection lines within multiple sections of the inter-subpixel region, the one of the multiple patterns of antennas corresponding to the one of the multiple operation modes of the display apparatus.

14. The display apparatus of claim 13, wherein the display substrate is a color filter substrate of the display apparatus.

15. A method for operating a display apparatus comprising a display substrate, a driving chip, a transmission signal generator, and a sensing signal identifier, wherein the display substrate comprises a display area including a plurality of subpixel regions and an inter-subpixel region;

wherein the display substrate comprises an array of a plurality of subpixels, each subpixel including a subpixel region surrounded by multiple sections of the inter-subpixel region; and at least one antenna in the inter-subpixel region and configured to detect an electromagnetic wave signal;

wherein the at least one antenna is configured to be one of multiple patterns, each pattern comprising one or more antenna lines respectively in one or more sections of the inter-subpixel region connected by one or more connection lines in one or more alternate sections of the inter-subpixel region based on a user-selection of multiple operation modes;

wherein each of the multiple antennas comprises multiple antenna lines, multiple connection lines, and multiple switch sets, the multiple antenna lines being parallel to each other and the multiple connection lines being perpendicular to the adjacent multiple antenna lines, each pair of adjacent antenna lines being connected by at least one of the multiple connection lines including a switch set;

wherein the switch set includes:

a first switch device near a first one of the pair of antenna lines and a second switch device near the second one of the pair of antenna lines, wherein the first switch device includes:

a first terminal coupled to the corresponding connection line, a second terminal coupled to the first one of the pair of antenna lines, and a first control terminal, wherein the second switch device includes:

a first terminal coupled to the second one of the pair of antenna lines, a second terminal coupled to the corresponding connection line, and a second control terminal, the first switch device being turned on to connect its first terminal to its second terminal when the first control terminal receives a first turn-on signal, the second switch device being turned on to connect its first terminal to its second terminal when the second control signal receives a second turn-on signal;

wherein the multiple patterns of antennas respectively correspond to the multiple operation modes, each pattern being formed by controlling the one or more switch sets selected to connect one or more corresponding connection lines for linking one or more corresponding pairs of the multiple antenna lines based on one of the multiple operation modes;

wherein the multiple patterns of antennas comprise at least a first pattern substantially with one or more antenna lines in strip shape extended along one or more edges of the display area and a second pattern substantially with one or more closed-loop shapes distributed partially across the display area, the first pattern and the second pattern being respectively used for a first operation mode using a gesture for remote operation from a side of the display substrate and a second operation mode using a gesture for remote operation in front of the display substrate;

wherein any one of the multiple antennas comprises at least one transmission antenna configured to transmit electromagnetic waves to nearby space beyond the display substrate and at least one receiving antenna configured to detect a sensing signal formed by a modification of the electromagnetic waves induced by an object;

wherein the transmission signal generator is coupled to the transmission antenna for transmitting electromagnetic waves, the sensing signal identifier is coupled to the receiving antenna to receive the sensing signal and configured to identify an operation command by decoding the sensing signal, the driving chip is coupled to the sensing signal identifier to receive the operation command and execute the operation command through interaction with at least part of an image displayed by the display substrate;

the method comprising:

receiving an operator signal for initiating one of multiple operation modes;

generating a selection trigger command based on the operator signal;

executing the selection trigger command to generate a mode-selection signal corresponding to one pattern of the multiple patterns of antennas;

processing the mode-selection signal to generate one or more control signals;

applying the one or more control signals to selectively turn on one or more switch sets in one or more connection lines to connect one or more pairs of antenna lines leading to a formation of the one pattern of the multiple patterns of antennas distributed fully within some sections of the inter-subpixel region, wherein the one pattern of the multiple patterns of antennas is used for transmitting electromagnetic waves and receiving sensing signals according to the one of multiple operation modes.

16. The method of claim 15, wherein the operator signal is initiated by an operator with a remote gesture for operating the display apparatus.

17. The method of claim 15, wherein the multiple patterns of antennas comprise at least a first pattern having one or more pairs of antenna lines in strip shape extended along one or more edges of the display area and a second pattern having one or more closed-loop shapes distributed partially across the display area, the first pattern and the second pattern being respectively used for a first operation mode with a remote gesture at a side of the display apparatus and a second operation mode with a remote gesture in front of the display apparatus.

* * * * *